US008511659B2

(12) United States Patent
Hirakawa et al.

(10) Patent No.: US 8,511,659 B2

(45) Date of Patent: Aug. 20, 2013

(54) HOLDING JIG, MEASUREMENT DEVICE AND HOLDING DEVICE USING THE SAME

(75) Inventors: Toshihiro Hirakawa, Kasugai (JP); Satoshi Sakashita, Yokkaichi (JP); Shinji Ishida, Nagoya (JP); Hiroyuki Nagaoka, Kakamigahara (JP)

(73) Assignee: NGK Insulators, Ltd., Nagoya (JP)

( * ) Notice: Subject to any disclaimer, the term of this patent is extended or adjusted under 35 U.S.C. 154(b) by 426 days.

(21) Appl. No.: 12/722,023

(22) Filed: Mar. 11, 2010

(65) Prior Publication Data

US 2010/0244345 A1 Sep. 30, 2010

(30) Foreign Application Priority Data

Mar. 31, 2009 (JP) ................................ 2009-087940

(51) Int. Cl.

| | |
|---|---|
| ***B23Q 3/08*** | (2006.01) |
| ***B23Q 3/00*** | (2006.01) |
| ***B25B 1/20*** | (2006.01) |
| ***B25B 1/06*** | (2006.01) |

(52) U.S. Cl.

USPC ........... 269/35; 269/43; 269/45; 269/254 CS; 269/309; 269/310

(58) Field of Classification Search

USPC ........................ 269/43, 45, 254 CS, 309–310

See application file for complete search history.

(56) References Cited

U.S. PATENT DOCUMENTS

| | | | | |
|---|---|---|---|---|
| 4,918,986 | A * | 4/1990 | Warkotsch | 73/487 |
| 5,398,541 | A | 3/1995 | Hijikata et al. | |
| 7,083,407 | B2 * | 8/2006 | Seki et al. | 425/534 |
| 2004/0074055 | A1 | 4/2004 | Watabe | |
| 2007/0163445 | A1 * | 7/2007 | Sakashita et al. | 96/421 |
| 2009/0102191 | A1 | 4/2009 | Nakata et al. | |
| 2009/0267343 | A1 | 10/2009 | Nakata et al. | |
| 2010/0095501 | A1 * | 4/2010 | Yoshioka et al. | 29/281.1 |

FOREIGN PATENT DOCUMENTS

| | | | |
|---|---|---|---|
| JP | 58-072244 | U | 5/1983 |
| JP | 07-266278 | A1 | 10/1995 |
| JP | 2807370 | B2 | 10/1998 |
| JP | 2003-113902 | A1 | 4/2003 |
| JP | 2004-129937 | A1 | 4/2004 |
| JP | 2005-172652 | A1 | 6/2005 |
| JP | 2008-157466 | A1 | 7/2008 |
| WO | 2007/114360 | A1 | 10/2007 |

* cited by examiner

*Primary Examiner* — Lee D Wilson
*Assistant Examiner* — Seahee Yoon
(74) *Attorney, Agent, or Firm* — Burr & Brown

(57) ABSTRACT

A holding jig including, a tilt angle with respect to a plane of a holding surface of a holding target defined as a holding tilt angle: a first holding portion having a holding tilt face with the holding tilt angle; a second holding portion connected to the first holding portion so as to slide toward the holding tilt face along a plane substantially parallel to the holding surface; and an elastic holding portion provided at a position of the second holding portion facing the holding tilt face that is elastically deformed towards the holding surface by the holding tilt face while being abutted to the holding tilt face, when the second holding portion slides toward the holding tilt face, to press and hold the holding target.

8 Claims, 12 Drawing Sheets

HOLDING JIG, MEASUREMENT DEVICE AND HOLDING DEVICE USING THE SAME

BACKGROUND OF THE INVENTION

1. Field of the Invention

The present invention relates to a holding jig, and a measurement device and a holding device using the jig. More particularly, it relates to a holding jig which can hold even a brittle holding target without damaging the target, and a measurement device which can measure the through channel characteristics of a fluid in a through channel of the holding target held by using the holding jig, while acquiring the air tightness of the holding target having therein the through channel for the fluid. Further particularly, it relates to a measurement device which can stably and simply measure the pressure loss of a filter.

2. Description of the Related Art

Heretofore, there has been a demand for the automation of processes such as a manufacturing process, an inspection process and a shipping process to manufacture highly brittle products having three-dimensional shapes, for example, a glass product, a ceramic product, a ceramic structure, a ceramic honeycomb structure and the like in large amounts and at a low cost along a manufacturing line of the products. In, for example, Japanese Patent Laid-Open No. 7-266278, there is disclosed an air bag which holds a insulator in a holding method of the insulator.

However, it has been difficult to fully automate holding means necessary for automating the processing, conveyance, measurement and the like of these highly brittle products having the three-dimensional shapes, because manpower is often required in the middle of each process along an automation line owing to the brittleness of the products. Moreover, the automated holding means requires not only an expensive control system but also much cost for the adjustment, operation and maintenance of the control system. Furthermore, there has been a limit to the speed of the automation line to prevent falling-down and damage due to added shock during the conveyance, processing, inspection and shipping.

As a catalyst carrier for purifying an exhaust gas discharged from an engine, a honeycomb structure is broadly used in which a plurality of cells provided side by side to connect two end faces to each other are formed by a plurality of partition walls. Moreover, as a filter for collecting and removing a particulate material included in a fluid such as the exhaust gas discharged from a diesel engine, a diesel particulate filter (DPF) is broadly used. The DPF includes the porous partition walls of the honeycomb structure provided with a large number of pores (communication pores), and the inflow end faces of the predetermined cells and the outflow end faces of the remaining cells are alternately plugged. The exhaust gas including the particulate material, which has flowed into the cells from the side of the inflow end faces thereof, flows out from the side of the outflow end faces through the partition walls which function as filter layers. At this time, the particulate material is collected on the porous partition walls.

Such a honeycomb structure or DPF (hereinafter referred to as the honeycomb structure in all) is usually installed and used along a passage for the exhaust gas discharged from the engine, but physical characteristics of the honeycomb structure have not a little influence on the performance of the engine, and hence it is necessary to beforehand measure various physical characteristics. Especially, it is necessary to beforehand measure a pressure loss at an arbitrary constant flow speed, as a part of the specifications of the honeycomb structure.

Heretofore, the measurement of the pressure loss of the honeycomb structure has usually been performed by providing the honeycomb structure as the target of the measurement of the pressure loss along a predetermined passage for the fluid and passing the fluid through the structure at a predetermined flow speed by fluid passing means such as a blower to measure the differential pressure of the fluid generated in this case (see, e.g., Japanese Patent No. 2807370).

Moreover, Japanese Patent Laid-Open No. 2005-172652 discloses a pressure loss measurement device of the honeycomb structure, and honeycomb structure retaining means (holding means) is used in this pressure loss measurement device. This honeycomb structure holding means used in the pressure loss measurement device of the honeycomb structure includes one or more elastic seal members constituted of a first holding means element which holds the inflow end face side of the filter and a second holding means element which holds the outflow end face side of the honeycomb structure, and at least a part of the first and second holding means elements is formed into a tubular shape having a hollow portion, and the seal members are provided in a ring shape. The holding means also includes a frame member provided outside the elastic seal member. The end of the honeycomb structure including the inflow end face and/or the outflow end face is inserted into the elastic seal member, and a gas or a liquid is introduced into the hollow portion of the elastic seal member to expand the elastic seal member, whereby the outer peripheral surface of the honeycomb structure and the elastic seal member, the frame member and the elastic seal member, or the elastic seal members can come in contact closely with each other to hold the honeycomb structure.

Moreover, the honeycomb structure holding means described in Japanese Patent Laid-Open No. 2005-172652 acquires air tightness in the honeycomb structure on the sides of the inflow end face and outflow end face of the honeycomb structure by the tubular elastic seal member. At this time, when the whole shape of the honeycomb structure as the holding target is columnar, that is, when the sectional shape thereof is round, the honeycomb structure can be held while acquiring sufficient air tightness.

Moreover, in recent years, with the tightening of environmental standards, the honeycomb structure has been lightened and space-saved, and hence there is a rising demand for the honeycomb structure having a sectional shape other than a round shape. As to the honeycomb structure holding means described in Japanese Patent Laid-Open No. 2005-172652, when the honeycomb structure having such a shape is the holding target, the tubular elastic seal member is deformed in accordance with the shape of the holding target, and a gap is made between the member and a portion of the sectional shape of the holding target in which a curvature radius partially decreases, whereby the deformed member cannot keep the air tightness.

Furthermore, as the above honeycomb structure having the sectional shape other than the round shape, a ceramic honeycomb structure is often integrally formed when manufactured. However, the dimensional precision of the outer diameter of the cross section of the integrally formed honeycomb structure is often poor as compared with the honeycomb structure having an outer periphery thereof coated. Also in this case, the holding means described in Japanese Patent Laid-Open No. 2005-172652 has poor air tightness, and it is difficult to obtain the precise and stable pressure loss.

SUMMARY OF THE INVENTION

The present invention has been developed in view of the problems of such a conventional technology, and an object thereof is to provide a holding jig which can hold even a brittle product, and a measurement device using the jig.

As a result of intensive investigation for achieving the above object, the present inventors have found that the object is achieved by employing the following constitution, and have completed the present invention. That is, the present invention is as follows.

According to a first aspect of the present invention, a holding jig is provided, the holding jig comprising, in a case where a tilt angle with respect to a plane as a holding surface of a holding target is defined as a holding tilt angle: a first holding portion having a holding tilt face with the holding tilt angle; a second holding portion connected to the first holding portion so as to slide toward the holding tilt face along a plane substantially parallel to the holding surface; and an elastic holding portion provided at a position of the second holding portion facing the holding tilt face and configured to be elastically deformed toward the holding surface by the holding tilt face while abutting on the holding tilt face, when the second holding portion slides toward the holding tilt face, to press and hold the holding target.

According to a second aspect of the present invention, the holding jig according to the first aspect of the present invention is provided, wherein the holding tilt face and the elastic holding portion are provided at positions facing the holding surface and in shapes corresponding to the holding surface in a plane vertical to a slide direction in a case where the slidable direction of the second holding portion is defined as the slide direction.

According to a third aspect of the present invention, the holding jig according to the first aspect of the present invention is provided, wherein in the plane vertical to the slide direction, the holding tilt angle is increased or decreased in the slide direction in accordance with the size of the curvature radius of the sectional shape of the holding surface.

According to a fourth aspect of the present invention, the holding jig according to the first aspect of the present invention is provided, wherein the holding tilt face and the elastic holding portion are provided in a ring shape, and the holding surface of the holding target is configured to be air-tightly held by the elastic holding portion over the whole periphery thereof.

According to a fifth aspect of the present application, a measurement device using two holding jigs according to the fourth aspect of the present application is provided, as a first holding jig and a second holding jig, comprising fluid passing means driven so that the fluid passes through the through channel of the holding target having an inflow end face through which the fluid flows into the holding target, an outflow end face through which the fluid flows out of the holding target and the through channel through which the fluid flows inwardly and outwardly in the holding target; and through channel characteristic measurement means for measuring through channel characteristics of the fluid passing through the holding target, wherein the through channel characteristics of the fluid generated during the passing of the fluid are measured by the through channel characteristic measurement means, while air-tightly holding the holding surface of the holding target over the whole periphery of the side surface thereof on the side of the inflow end face by the first holding jig and while air-tightly holding the holding surface of the holding target over the whole periphery of the side surface thereof on the side of the outflow end face by the second holding jig.

According to a sixth aspect of the present invention, the measurement device according to the fifth aspect of the present invention is provided, the measurement device further comprising: a pair of pressure measurement means provided as the through channel characteristic measurement means on the inflow end face side and the outflow end face side, wherein a pressure loss generated during the passing of the fluid through the holding target is measured by a pressure difference measured by the pair of pressure measurement means.

According to a seventh aspect of the present invention, a holding device in which the holding jig according to the first aspect of the present invention is provided in a support portion, wherein the holding jig holds the holding target.

According to an eighth aspect of the present invention, the holding device according to the seventh aspect of the present invention is provided, the holding device comprising: the support portion provided with at least one holding jig; and a pressing jig provided in the support portion and disposed at a position facing the holding tilt face of the at least one holding jig, wherein the holding target is held by the holding jig and the pressing jig.

The holding jig of the present invention can hold even a brittle holding target without damaging the target, and the measurement device using the holding jig can measure the through channel characteristics of the fluid in the through channel of the holding target held while acquiring the air tightness of the holding target having therein the through channel for the fluid.

DESCRIPTION OF REFERENCE NUMERALS

1: pressure loss measurement device, 2: honeycomb structure, 3: holding jig, 4: blower, 5: ultrasonic flow rate meter, 6: passage, 13: discharge port, 14: suction silencer, 21: servo valve, 26: holding target, 27: guide projection, 28: holding surface, 31: tubular elastic seal member, 33*a*: inflow end face, 33*b*: outflow end face, 40: sample box, 46: first holding portion, 48: holding face side tilt face, 49: holding tilt angle, 48: holding tilt face, 56: second holding portion, 58: slide means, 62: elastic holding portion, 63: tip portion of elastic holding portion, 64: tilt face side tip face, 66, 67: common frame portion, 68, 69: exclusive-use frame portion, 71: pressing jig, 100: holding device, 101: holding device, 102: holding jig (holding device), 101: holding device, 103*a*: first holding jig, 103*b*: second holding jig, 127: guide projection, 146: first holding portion provided in ring shape, 156: second holding portion provided in ring shape, 162: elastic holding portion provided in ring shape, 170*a*: ring-shaped support portion, 170*b*: ring-shaped support portion, 171: support portion, 253: arm, 252: conveyance means, P1, P2: pressure meter, and T: thermometer.

DETAILED DESCRIPTION OF THE INVENTION

Hereinafter, an embodiment of the present invention will be described, but it should be understood that the present invention is not limited to the following embodiment and that the alternation, modification and the like of design are appropriately added based on the ordinary knowledge of a person with ordinary skill without departing from the scope of the present invention.

Figure 1A:
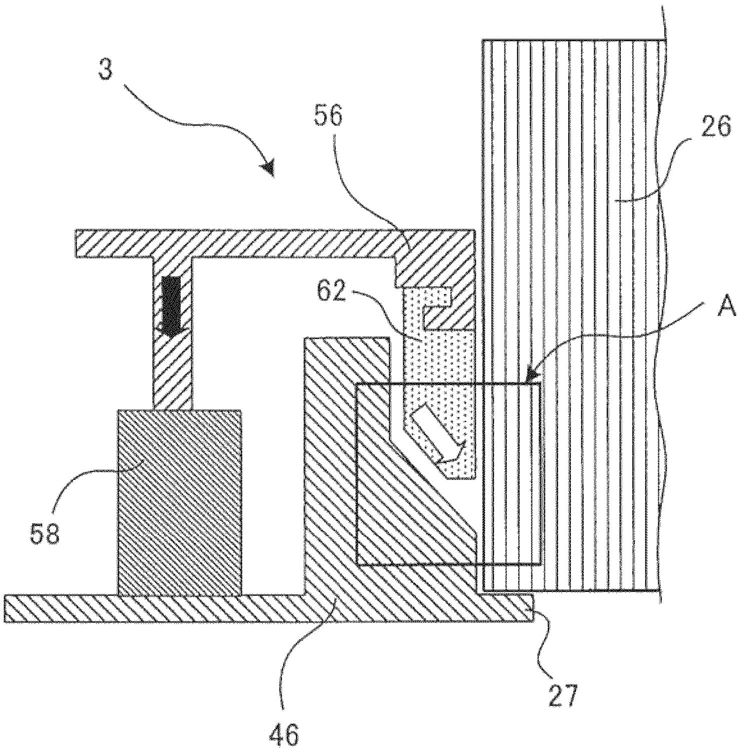
FIG. 1A is a schematic sectional view showing one embodiment of a holding jig of the present invention.
Figure 1B:
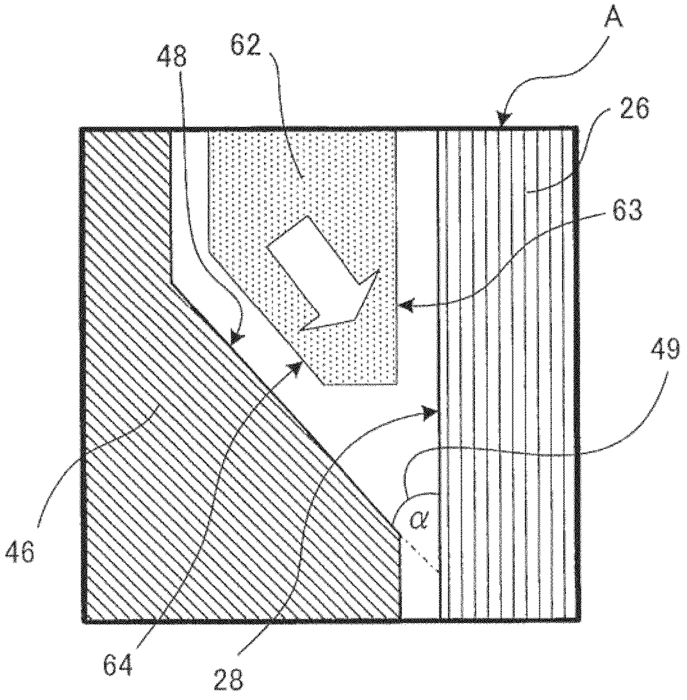
FIG. 1B is a schematic plan view showing the embodiment of the holding jig of the present invention, and a partially enlarged sectional view of a region A of FIG. 1A.
Figure 2A:
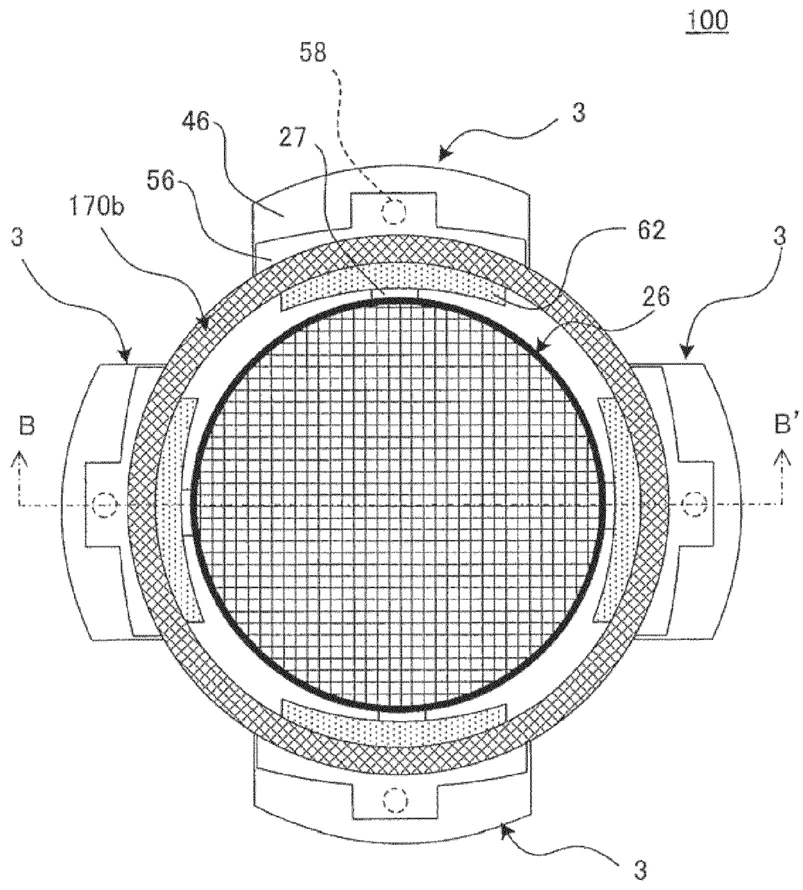
FIG. 2A is a schematic plan view showing one embodiment of a holding device provided with four holding jigs.
Figure 2B:
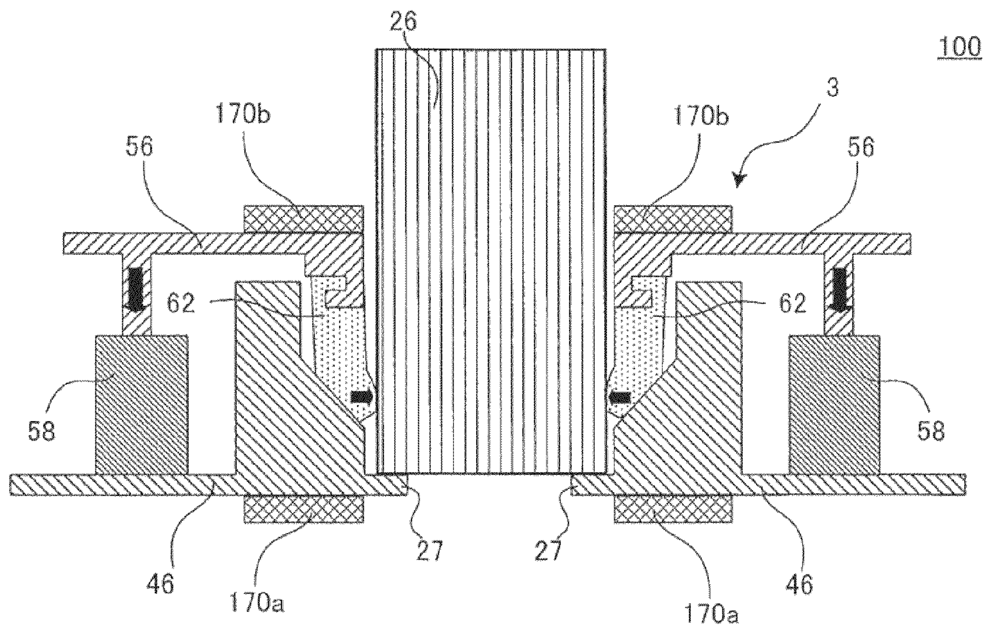
FIG. 2B is a schematic sectional view cut along the B-B' line of FIG. 2A and showing the embodiment of the holding device provided with four holding jigs.

FIG. 1A is a schematic sectional view showing one embodiment of a holding jig of the present invention. FIG. 1B is a partially enlarged sectional view of a region A of FIG. 1. FIG. 2A is a plan view showing a holding device 100 provided with four holding jigs provided in a ring shape with a constant space being left therebetween. FIG. 2B is a sectional view cut along the B-B' line of FIG. 2A. In a case where a tilt angle 49 of a first holding portion with respect to a plane as a holding surface 28 of a holding target 26 is defined as the holding tilt angle α, a holding jig 3 of the present invention includes a first holding portion 46 having a holding tilt face 48 with a holding tilt angle α; and a second holding portion 56 connected to the first holding portion 46 so as to slide toward the holding tilt face 48 along a plane substantially parallel to the holding surface 28. Moreover, the holding jig 3 of the present invention further includes an elastic holding portion 62 provided at a position of the first holding portion 46 facing the holding tilt face 48. The elastic holding portion 62 is elastically deformed toward the holding surface 28 by the holding tilt face 48 while abutting on the holding tilt face 48 in a case where the second holding portion 56 slides toward the holding tilt face 48, to press and hold the holding target 26.

The elastic holding portion 62 has flexibility, and can securely hold a brittle product without damaging the product during conveyance. Moreover, a holding tilt angle α of the holding tilt face 48 is increased or decreased in accordance with the holding surface 28 of the holding target 26, whereby more secure holding can be realized. Furthermore, the first holding portion 46 is slidably connected to the second holding portion 56, and a holding force is controlled by this slide movement, which enables precise and subtle control. Therefore, the present invention is preferably used in a holding target portion having high brittleness. Moreover, when this slide movement is controlled by, for example, an air cylinder, isobaric control is preferably facilitated, and any mechanical control system does not have to be introduced. Moreover, the movement is controlled by the pressure of a gas, and hence the holding target is preferably not easily damaged. Moreover, excellent maintenance properties are also preferably obtained.

Figure 3:
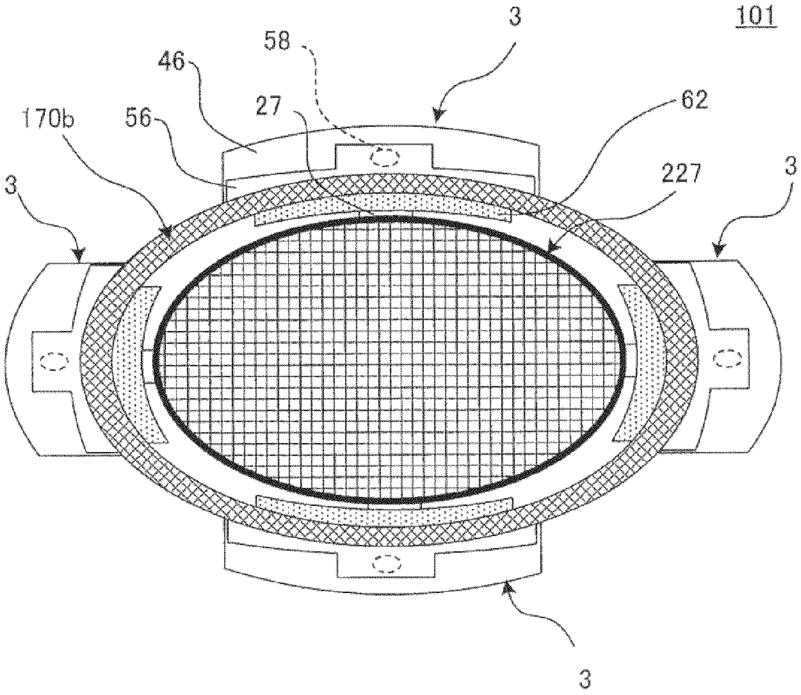
FIG. 3 is a schematic plan view showing another embodiment of the holding device of the present invention.

In a holding device using the holding jig of the present invention, the holding tilt face 48 and the elastic holding portion 62 are preferably provided along the sectional shape of the holding target 26 in a plane vertical to a slide direction in a case where a direction in which the second holding portion can slide is defined as the slide direction (see FIGS. 2A, 2B and 3).

As shown in FIG. 2A, when the holding target has a circular sectional shape in the plane vertical to the slide direction, the holding device 100 is provided with four holding jigs 3 along this sectional shape. FIG. 2B is a sectional view cut along the B-B' line of FIG. 2A. As shown in FIG. 3, when the holding target has an elliptic sectional shape in the plane vertical to the slide direction, a holding device 101 is provided with four holding jigs 3 along this sectional shape. In the holding device 101, as the holding target 26, a honeycomb structure 227 is employed which has an elliptic sectional shape in the plane vertical to the slide direction.

The holding device 101 uses holding jigs 3 each having a shape formed along the elliptic sectional shape of the honeycomb structure 227 in a plane vertical to the slide direction and each including a holding tilt face 48 and an elastic holding portion 62. The jigs having such a shape can securely hold the holding target. Moreover, examples of the material of the elastic holding portion 62 preferably include a synthetic rubber and a resin.

Figure 13A:
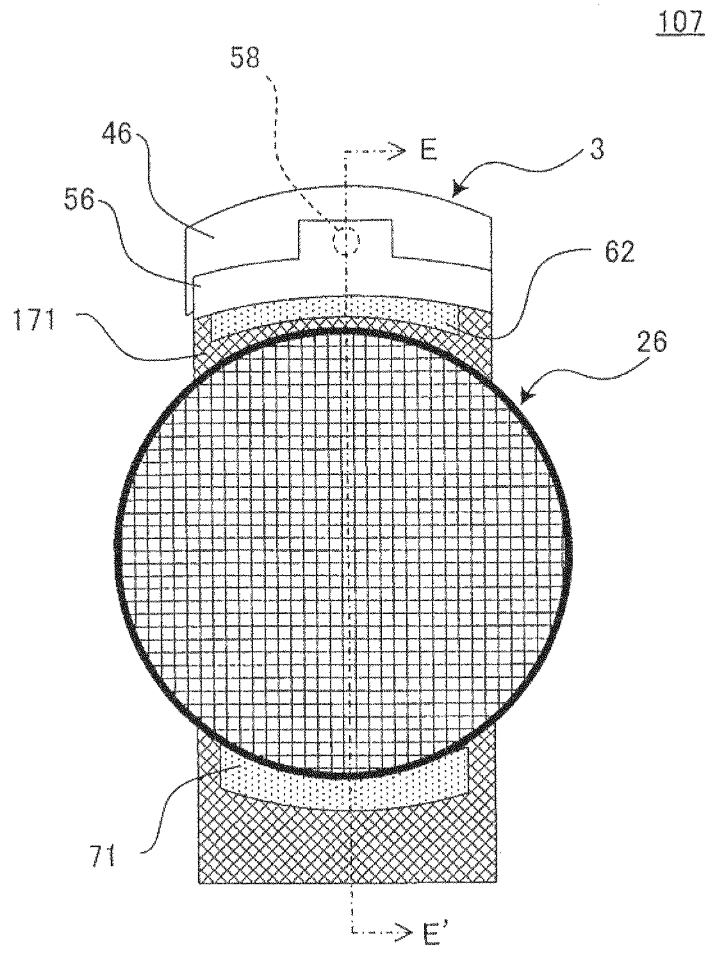
FIG. 13A is a schematic plan view showing another embodiment of the holding jig of the present invention.
Figure 13B:
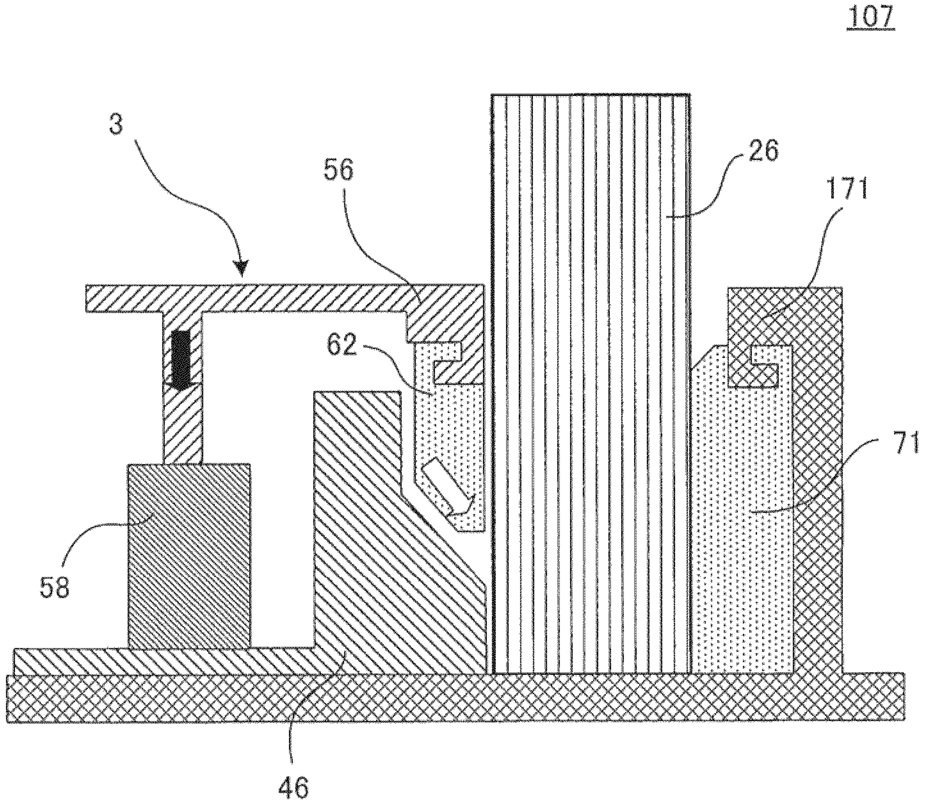
FIG. 13B is a schematic sectional view cut along the E-E' line of FIG. 13A and showing the embodiment of the holding jig of the present invention.

Moreover, another embodiment of the holding device using the holding jig of the present invention is a holding device including at least one holding jig and a pressing jig provided at a position facing the holding jig, and the holding jig and the pressing jig are provided in a support portion of the holding device. FIG. 13A shows a holding device in which one holding jig and a pressing jig 71 provided at a position facing this holding jig are provided in a support portion 171. According to such a constitution, the target can securely be held at a low cost.

Figure 7A:
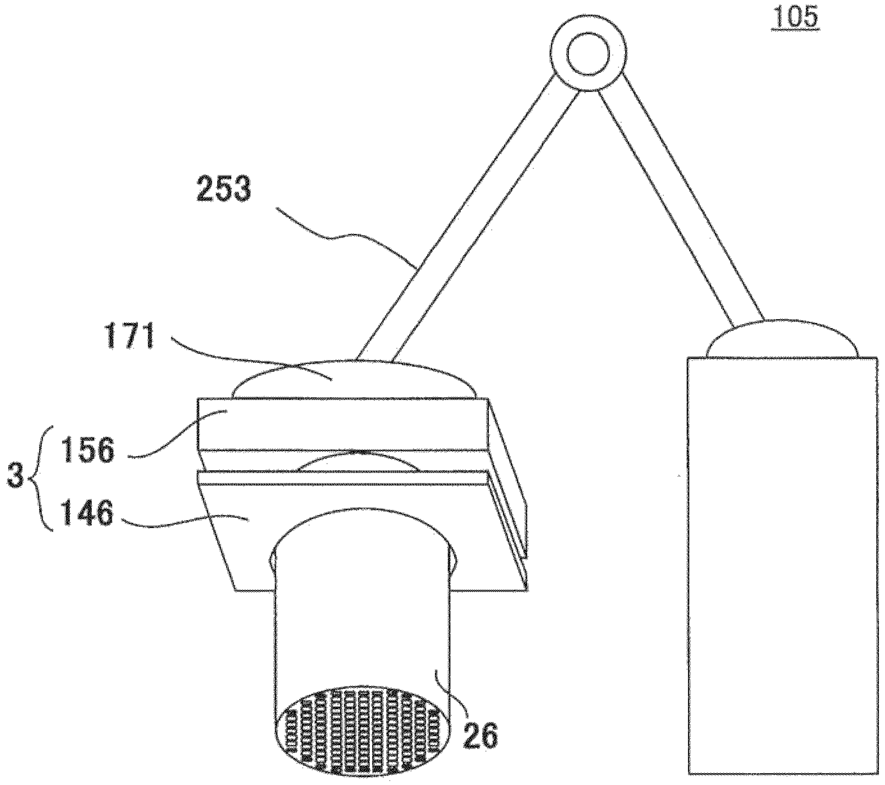
FIG. 7A is an explanatory view showing one example of the holding device using the holding jig of the present invention.

Still another embodiment of the holding device using the holding jig of the present invention is a holding device 105 such as an industrial robot including an automatically controllable arm 253 as shown in FIG. 7A. As shown in FIG. 7A, a holding jig 3 is attached to a support portion 171 at the tip of the arm 253, whereby in an automation line or the like, a holding target is correctly and surely held without requiring any manual operation, and the position or state of the holding target can be kept during conveyance or in each process. Especially, when the holding target is a honeycomb structure, the manufacturing process of the structure includes various inspecting and processing processes, and hence the present invention exerts a remarkable effect.

Figure 7B:
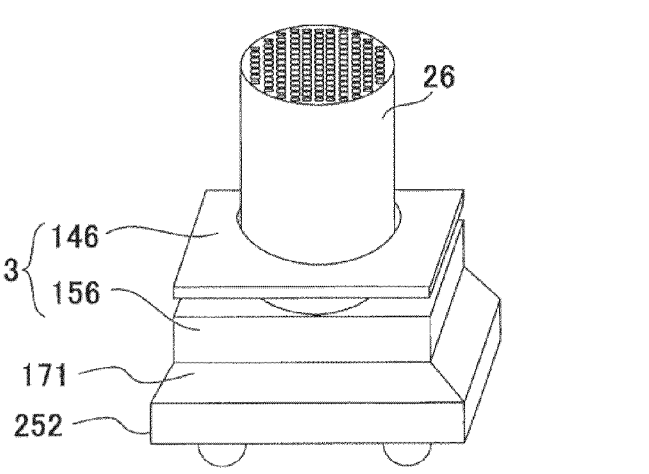
FIG. 7B is an explanatory view showing the example of the holding device using the holding jig of the present invention.

Moreover, a further embodiment of the holding device using the holding jig of the present invention is a holding device 106 including automatically controllable conveyance means 252 such as an automatic conveyance system as shown in FIG. 7B. As shown in FIG. 7B, a holding jig 3 is attached to a support portion 171 of the conveyance means 252, whereby in an automation line or the like, a holding target is correctly and surely held without requiring any manual operation, and the position or state of the holding target can be kept during conveyance or in each process. Especially, when the holding target is a honeycomb structure, the manufacturing process of the structure includes various inspecting and processing processes, and hence the present invention exerts a remarkable effect.

The combined use of the holding device 105 in which the holding jig of the present invention is attached to the tip of the arm as shown in FIG. 7A or the holding device 106 including the conveyance means 252 as shown in FIG. 7B can realize the decrease of a defect ratio by stable conveyance and efficient processing or the improvement of a production efficiency in each manufacturing process of a brittle product such as the honeycomb structure as the holding target 26.

Figure 4A:
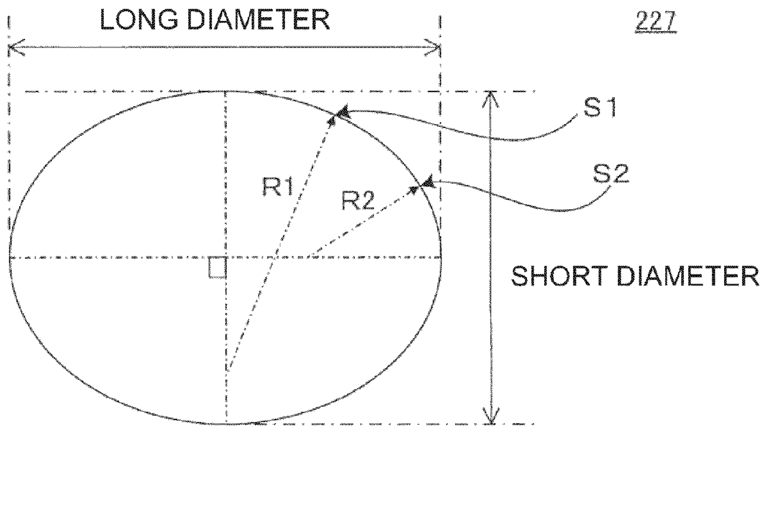
FIG. 4A is a sectional view showing a honeycomb structure having an elliptic cross section as one example of a holding target.

In the present invention, the holding tilt angle is preferably partially increased or decreased in accordance with the size of the curvature radius of the sectional shape of the holding target 26 in the plane vertical to the slide direction. According to such a configuration, the holding target can surely be held in accordance with the curvature radius of the holding target having a plurality of curvature radii without changing the pressing force of the second holding portion 56 and while preventing the concentration of the holding pressure on a specific portion. FIG. 4A is a sectional view showing the honeycomb structure 227 having an elliptic cross section in the plane vertical to the slide direction as one example of the holding target. At this time, a curvature radius S1 is different from a curvature radius S2, but the holding target is preferably provided so that the holding tilt angle α is increased at the curvature radius S2 smaller than S1.

Figure 4B:
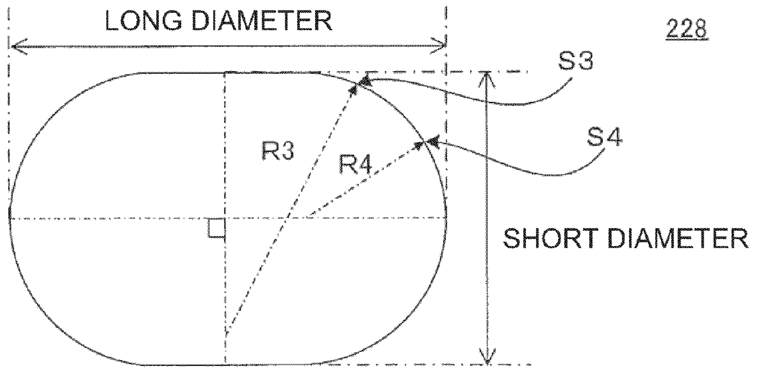
FIG. 4B is a sectional view showing a honeycomb structure having a race-track-like cross section as another example of the holding target.
Figure 4C:
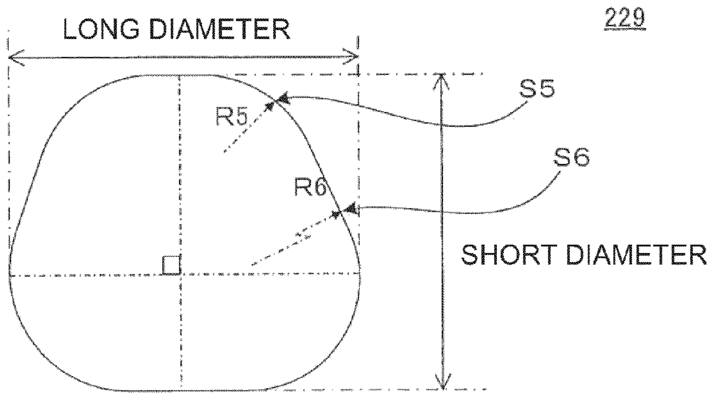
FIG. 4C is a sectional view showing a honeycomb structure having a rounded trapezoidal cross section as still another example of the holding target.

FIG. 4B is a sectional view showing a honeycomb structure 228 having a race-track-like cross section in the plane vertical to the slide direction as one example of the holding target. FIG. 4C is a sectional view showing a honeycomb structure 229 having a rounded trapezoidal cross section in the plane vertical to the slide direction as one example of the holding target. The holding tilt angle α is preferably appropriately adjusted in accordance with the curvature radius of the holding surface.

Figure 5A:
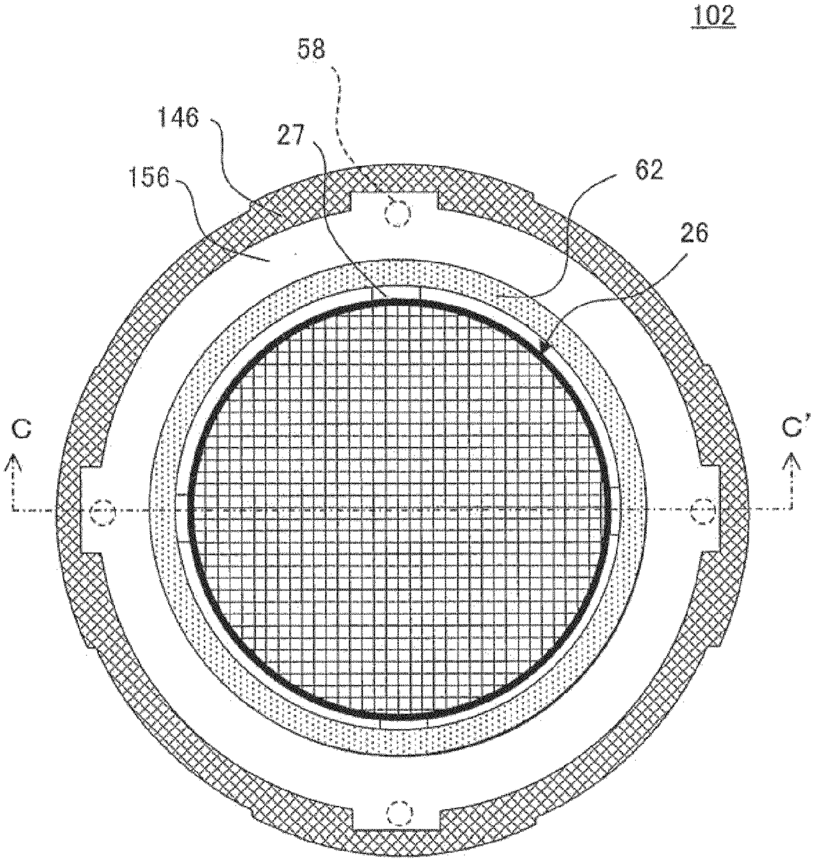
FIG. 5A is a schematic plan view showing another embodiment of the holding jig of the present invention.
Figure 5B:
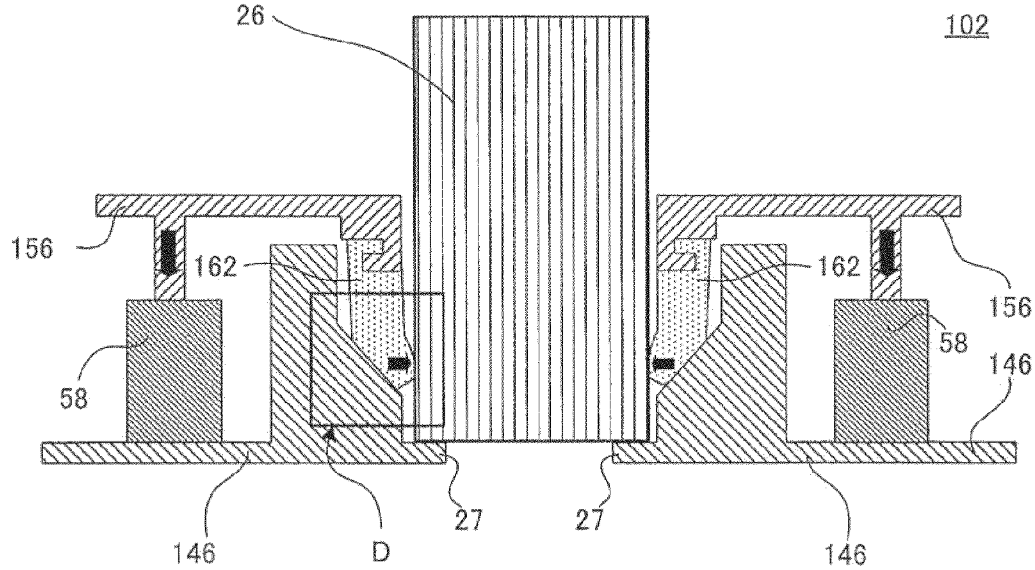
FIG. 5B is a schematic sectional view cut along the C-C' line of FIG. 5A and showing the embodiment of the holding jig of the present invention.
Figure 6A:
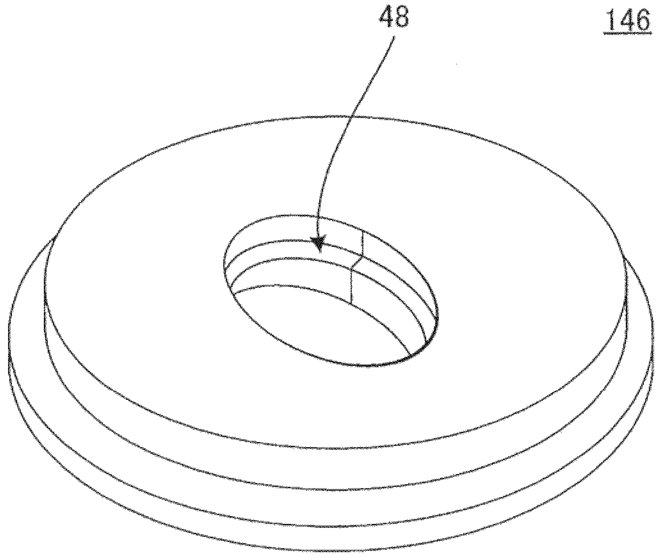
FIG. 6A is a schematic perspective view showing one example of a first holding portion provided in a ring shape.
Figure 6B:
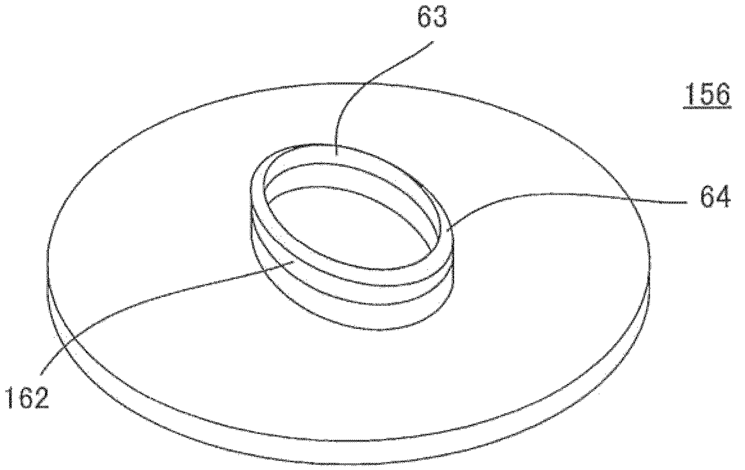
FIG. 6B is a schematic perspective view showing one example of a second holding portion provided in a ring shape.

In the holding jig of the present invention, the holding tilt face and the elastic holding portion are preferably provided in a ring shape, and the holding surface can air-tightly be held by the elastic holding portion over the whole periphery of the holding target. FIG. 5A is a schematic plan view of a holding jig 102. In the holding jig, the holding tilt face and the elastic holding portion are provided in a ring shape along the holding surface of the holding target. FIG. 5B is a sectional view of the holding jig 102. In the holding jig, the holding tilt face and the elastic holding portion are provided in a ring shape seen from the side surface of the jig. FIG. 5B is a sectional view cut along the C-C' line of FIG. 5A. Moreover, FIG. 6A shows a first holding portion 146 provided in a ring shape. Furthermore, FIG. 6B shows a second holding portion 156 provided in a ring shape.

Figure 5C:
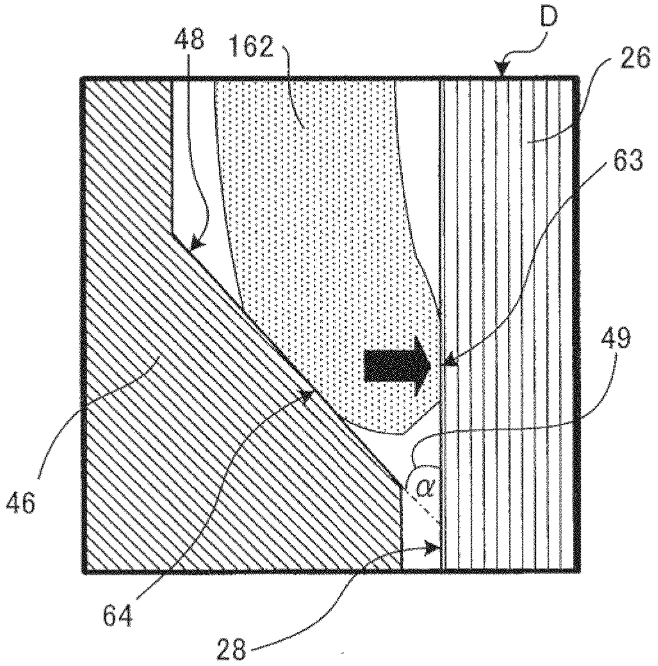
FIG. 5C is a partially enlarged schematic sectional view of a region D of FIG. 5B showing the embodiment of the holding jig of the present invention.

FIG. 5C is a partially enlarged sectional view of a region D of FIG. 5B. As shown in FIG. 5C, an elastic holding portion 162 provided in a ring shape is pressurized by slide means 58, pressed onto a holding tilt face 48, and a tip portion 63 of the elastic holding portion 162 is then elastically deformed to press and hold a holding target 26. Moreover, the elastic holding portion 162 provided in the ring shape is pressurized by the slide means to come in contact with a holding tilt face side tip face 64 and the holding tilt face 48, thereby acquiring air tightness.

When the holding jig 102 provided in such a ring shape is used, the holding target can be held while acquiring the air tightness. Consequently, the present invention is preferably used in a measurement device which measures the through channel characteristics in the holding target (e.g., the honeycomb structure or the like) as follows.

Figure 8:
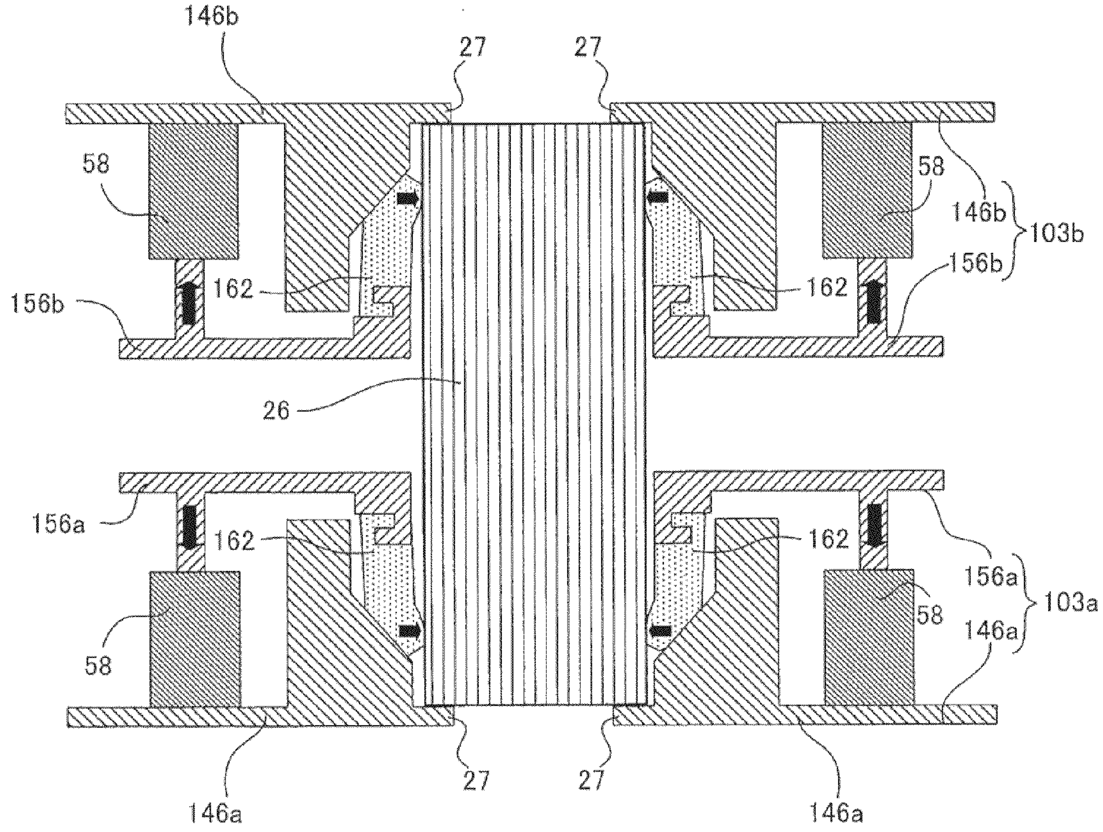
FIG. 8 is a diagram showing one example of a state in which a honeycomb structure is held in a measurement device using the holding jig of the present invention.

The measurement device using the pair of holding jigs as the first and second holding jigs of the present invention will be described. It is possible to measure the through channel characteristics in the through channel of the holding target (e.g., the honeycomb structure or the like) having the inflow end face and outflow end face through which the fluid flows inwardly or outwardly through the through channel. Examples of the through channel characteristics include a flow rate, a pressure, and pressure losses in the inflow end face and outflow end face. As shown in, for example, FIGS. 8, 12, the measurement device according to one embodiment of the present invention includes fluid passing means which is driven so that a fluid passes through the through channel of a holding target, and through channel characteristic measurement means (an ultrasonic flow rate meter 5) for measuring the through channel characteristics of the fluid passing through the holding target (a honeycomb structure 2). Moreover, as one example of the measurement device of the embodiment of the present invention, the measurement device measures the through channel characteristics of the fluid generated during the passing of the fluid by the through channel characteristic measurement means while air-tightly holding the holding surface of the holding target 26 over the whole periphery of the side surface thereof on the side of an inflow end face 33*a* by a first holding jig 103*a* (see FIG. 8) and while air-tightly holding the holding surface of the holding target over the whole periphery of the side surface thereof on the side of an outflow end face 33*b* by a second holding jig 103*b* (see FIG. 8).

Figure 12:
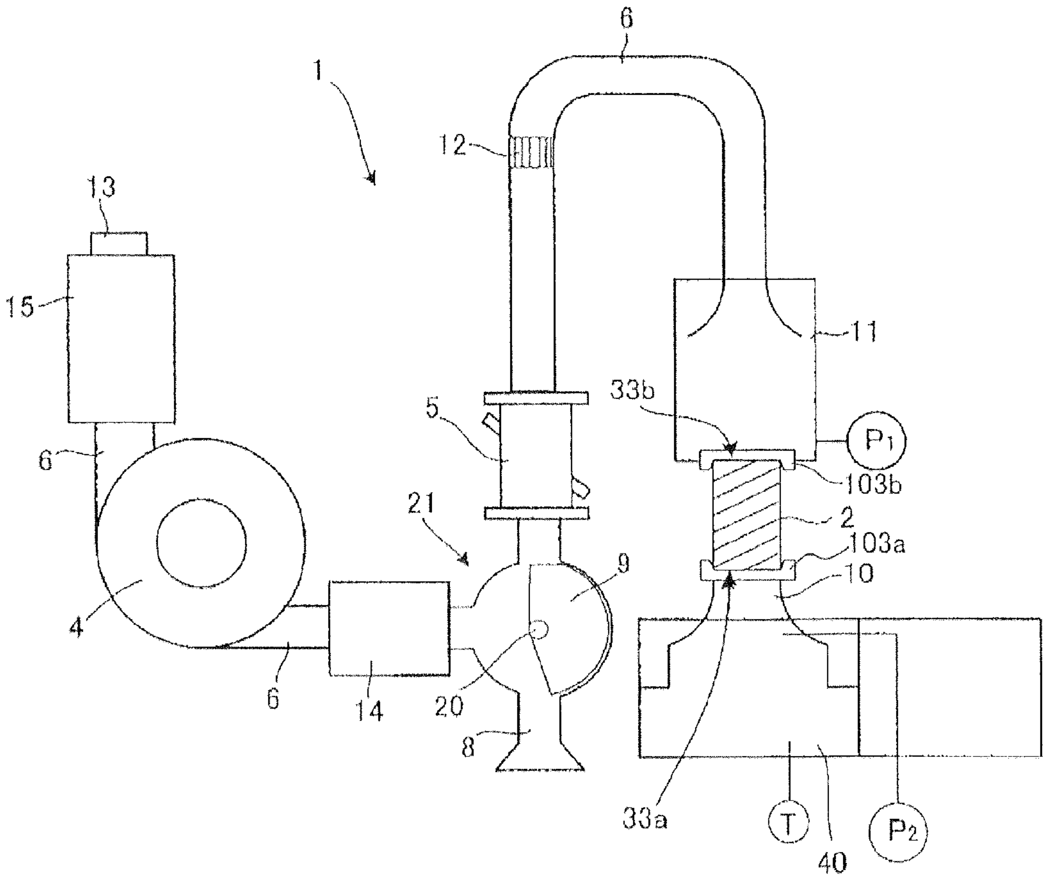
FIG. 12 is an explanatory view of the measurement device schematically showing one embodiment of the measurement device using the holding jig of the present invention.

As another embodiment of the measurement device using the holding jig of the present invention, a pressure loss measurement device can measure the pressure losses of the holding target 26 (e.g., the honeycomb structure 2) including the through channel on inflow and outflow end face sides thereof. FIG. 12 is a schematic diagram showing the embodiment of the measurement device used as the pressure loss measurement device for the honeycomb structure according to the present invention. As shown in FIG. 12, a pressure loss measurement device 1 of the present embodiment includes a first holding jig 103*a* and a second holding jig 103*b* which can hold the honeycomb structure 2 as the holding target.

It is to be noted that in the pressure loss measurement device 1 of the present embodiment has a chamber 11 with a pressure meter P1 and, for example, a sample box 40 or the like preferably provided with a measurement means typified by a thermometer T and a pressure meter P2 and capable of measuring physical amounts (e.g., a temperature, an atmospheric pressure, etc.) indicating a measurement environment during the measurement of the pressure loss of the honeycomb structure 2. The pressure loss of the honeycomb structure 2 is measured by the pressure difference between pressure meter P1 of chamber 11 and pressure meter P2 of sample box 40, and the error of the measured value due to the difference of the measurement environment can be suppressed to obtain a more stable measurement result.

Moreover, the pressure loss measurement device 1 shown in FIG. 12 includes a blower 4 which functions as the fluid passing means driven so that the fluid (air) passes through the honeycomb structure 2. The blower 4 preferably has a performance (a rotation number (the speed), displacement or the like) in accordance with the size of the honeycomb structure 2 as a measurement target, the size of the value of the pressure loss or the like, and the rotation number of the blower is preferably controlled by an inverter. Furthermore, the blower 4 is preferably a turbo blower having a discharge pressure of 5 kPa or more, whereby the occurrence of the pulsation of the circulating fluid (the air) can be suppressed, the flow speed can correctly be set, and the pressure loss can be measured with a less measurement error. It is to be noted that to effectively suppress the occurrence of the pulsation of the circulating fluid (the air) and to enable the correct setting of the flow speed and the measurement of the pressure loss with the less measurement error, a turbo blower having a discharge pressure of further preferably 8 kPa or more, especially preferably 10 kPa or more is used as the fluid passing means.

Furthermore, the pressure loss measurement device 1 shown in FIG. 12 includes the ultrasonic flow rate meter 5 which functions as flow speed measurement means for measuring the flow speed of the air passing through the honeycomb structure 2, and a passage 6 which connects the above four means (the honeycomb structure holding means, the fluid passing means, the flow speed measurement means and the pressure loss measurement means) to one another so that the air can pass through the means and which connects the sample box 40 having an inlet port of the air to a discharge port 9. As the flow speed measurement means, various flow rate meters (flow speed meters) other than the ultrasonic flow rate meter 5 shown in FIG. 12 may be used. It is to be noted that rectification means such as a honeycomb rectifier 12 is preferably provided on the upstream side of the ultrasonic flow rate meter 5 in the passage 6 to stably measure the flow speed with a less error.

Moreover, in the pressure loss measurement device 1 of the present embodiment, silencers (a suction silencer 14, a discharge silencer 15) are preferably provided on the upstream side and/or the downstream side of the blower 4 as the fluid passing means in the passage 6 to decrease the noise of the blower 4.

Figure 9:
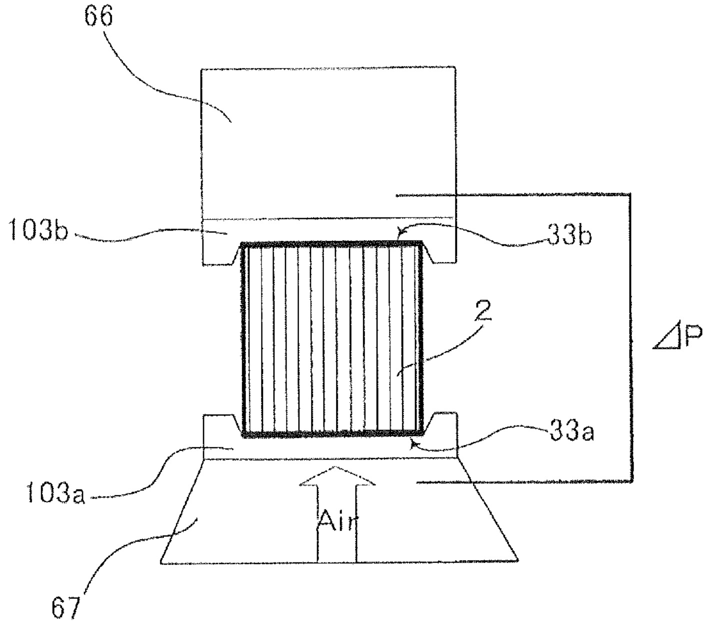
FIG. 9 is a diagram showing the example of the state in which the honeycomb structure is held in the measurement device using the holding jig of the present invention.

Heretofore, to hold the honeycomb structure, a method has been employed in which the honeycomb structure is held by a holding member or the like via seal members such as O-rings disposed on the inflow end face and outflow end face of the honeycomb structure, whereby an appropriate holding pressure is applied in a linear direction connecting the inflow end face to the outflow end face. However, according to this method, a part of the end face of the honeycomb structure through which an exhaust gas flows inwardly or outwardly is closed with the O-ring, and hence it has been difficult to correctly measure the pressure loss sometimes. However, according to the holding jig shown in FIGS. 5A to 5C, and the first and second holding jigs 103*a*, 103*b* of the pressure loss measurement device in the embodiment of FIG. 9 showing the holding state of the holding jig, the end faces of the honeycomb structure 2 are not closed, and the pressure loss can preferably more correctly be measured. Moreover, the expansion/contraction of the elastic holding portion 62 can enable the holding/detaching of the honeycomb structure 2. Therefore, even when the size of the honeycomb structure 2 fluctuates, the pressure loss can effectively be measured without changing the honeycomb structure holding means itself or the like.

Next, a use method of the pressure loss measurement device for the honeycomb structure according to the present invention will be described with respect to the pressure loss measurement device 1 shown in FIG. 12 as the example. First, according to the above method, the honeycomb structure 2 (an initial sample) which becomes a reference is held by the holding jigs 103*a*, 103*b*. Next, the blower 4 is driven so that the air passes through the honeycomb structure 2 and the passage 6. At this time, the measured value of the flow speed of the air by the ultrasonic flow rate meter 5 is monitored while rotating a passage opening/closing member 9 of a servo valve 21, and the rotation number of the blower 4 is set to such a rotation number that the flow speed can effectively be regulated by opening or closing a main passage 7 and a branch 8.

Afterward, the honeycomb structure 2 is successively changed, and the pressure loss is measured. The flow speed of the air passing through the honeycomb structure 2 can be regulated by the servo valve 21 in a state in which the rotation number of the blower 4 is constant. Therefore, the pressure losses of a large amount of honeycomb structures 2 can simply be measured for a short time while the flow speed is kept to be constant.

Hereinafter, the present invention will specifically be described based on examples, but the present invention is not limited to these examples.

EXAMPLES

Examples, Comparative Examples

Figure 10:
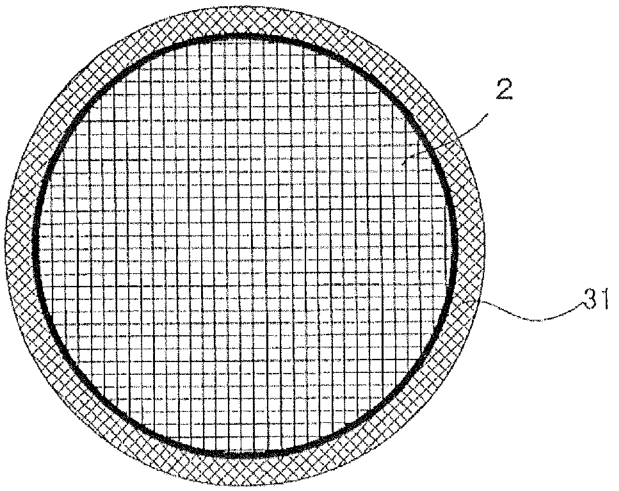
FIG.10 Prior Art
FIG. 10 is a schematic explanatory view for explaining a state in which the honeycomb structure is held in a measurement device using a conventional holding jig.
Figure 11:
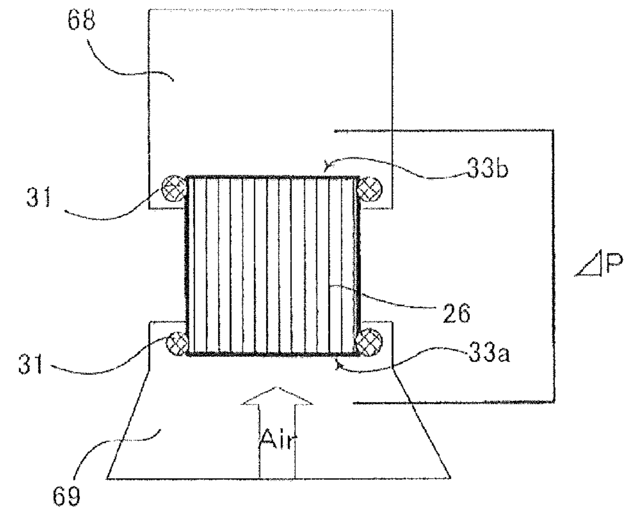
FIG.11 Prior Art
FIG. 11 is a sectional view showing one example of the state in which the honeycomb structure is held in the measurement device using the conventional holding jig.

The pressure losses of holding targets which were various ceramic honeycomb structures were measured by using a pressure loss measurement device 1 shown in FIG. 12 in examples and comparative examples. In Examples 1 to 7, a honeycomb structure 2 was held by using two holding jigs 102 of one embodiment of the present invention shown in FIGS. 5A to 5C as a first holding jig 103*a* and a second holding jig 103*b* while keeping air tightness in the side surfaces of the honeycomb structure on the side of an inflow end face 33*a* and an outflow end face 33*b*. In Comparative Examples 1 to 10, the pressure loss of the honeycomb structure 2 was measured while holding the honeycomb structure by using conventional holding jigs 68, 69 including tubular elastic seal members 31 for air-tightly holding the honeycomb structure as shown in FIGS. 10, 11. In Comparative Examples 1 to 10, the first holding jig 103*a* and the second holding jig 103*b* of the examples were replaced with the holding jigs 68, 69, respectively. Moreover, in the examples and comparative examples, comparison tests were carried out by using various honeycomb structures having different dimensions and characteristics. The honeycomb structures used as holding targets are shown in Table 1 (various DPFs, various honeycomb structures). Measurement results are shown in Table 1.

(Conventional Holding Jig)

As shown in FIGS. 10, 11, heretofore the holding jigs 68, 69 have been used in which the tubular elastic seal members 31 are provided in a ring shape such as a float shape, and a gas is forced into each seal member to contract or expand the seal member, thereby air-tightly holding the honeycomb structure. In Comparative Examples 1 to 9, the honeycomb structures were air-tightly held by using the conventional holding jigs, and the pressure losses were measured.

(Evaluation)

In a case where the value of the pressure loss (kPa) measured by an evaluation reference air channel is a reference value and the values of the pressure losses (kPa) measured by the pressure loss measurement device for the holding target in the Examples and Comparative Examples are measurement values, an absolute evaluation error of ±2% or less of the measurement value with respect to the reference value is judged to be satisfactory (OK), and a value larger than this error is judged to be defective (NG). Evaluation results are shown in Table 1.

TABLE 1

| | Measurement method | Sectional shape | Outer peripheral diameter mm | | Sectional area $cm^2$ | Target type | Outer peripheral portion | Cell structure mil/cpi | Measurement flow rate $Nm^3/min$ | Measurement number | Evaluation result |
|---|---|---|---|---|---|---|---|---|---|---|---|
| Comparative Example 1 | Conventional | Round | 266.7 | | 558.6 | DPF | Outer peripheral coat | 12/300 | 12 | 50 | OK |
| Comparative Example 2 | Conventional | Round | 190.5 | | 285 | DPF | Outer peripheral coat | 12/300 | 9 | 50 | OK |
| Comparative Example 3 | Conventional | Round | 266.7 | | 558.6 | Large honeycomb | Outer peripheral coat | 8/300 | 12 | 50 | OK |
| Comparative Example 4 | Conventional | Round | 190.5 | | 285 | Large honeycomb | Outer peripheral coat | 5/300 | 9 | 50 | OK |
| Example 1 | New | Round | 190.5 | | 285 | DPF | Outer peripheral coat | 12/300 | 9 | 50 | OK |
| Example 2 | New | Round | 190.5 | | 285 | Large honeycomb | Outer peripheral coat | 5/300 | 9 | 50 | OK |
| Comparative Example 5 | Conventional | Round | 143.8 | | 162.4 | DPF | Integral forming | 12/300 | 9 | 50 | NG |
| Example 3 | New | Round | 143.8 | | 162.4 | DPF | Integral forming | 12/300 | 9 | 50 | OK |
| Comparative Example 6 | Conventional | Round | 118.4 | | 110.1 | Self discharge honeycomb | Integral forming | 6/400 | 9 | 50 | NG |
| Example 4 | New | Round | 118.4 | | 110.1 | Self discharge honeycomb | Integral forming | 6/400 | 9 | 50 | OK |
| | | | Long dia. | Short dia. | | | | | | | |
| Comparative Example 7 | Conventional | Elliptic | 104.6 | 62.18 | 68.6 | Self discharge honeycomb | Integral forming | 6/400 | 9 | 50 | NG |
| Example 5 | New | Elliptic | 104.6 | 62.18 | 68.6 | Self discharge honeycomb | Integral forming | 6/400 | 9 | 50 | OK |
| Comparative Example 8 | Conventional | Race track | 120.7 | 68.5 | 82.3 | Self discharge honeycomb | Integral forming | 6/400 | 9 | 50 | NG |
| Example 6 | New | Race track | 120.7 | 68.5 | 82.3 | Self discharge honeycomb | Integral forming | 6/400 | 9 | 50 | OK |
| Comparative Example 9 | Conventional | Trapezoidal | 122.0 | 104.4 | 101.9 | Self discharge honeycomb | Integral forming | 6/400 | 9 | 50 | NG |
| Example 7 | New | Trapezoidal | 122.0 | 104.4 | 101.9 | Self discharge honeycomb | Integral forming | 6/400 | 9 | 50 | OK |

(Consideration)

It has been clarified from the comparative examples that the holding method using the conventional tubular elastic seal members 31 can be applied to the honeycomb structure having the outer periphery thereof coated and having a high dimensional precision, but the tubular elastic seal members cannot pursue the curvature radius or surface roughness of an integrally formed honeycomb structure or a honeycomb structure having a sectional shape other than a round shape, and cannot be applied to such a honeycomb structure. In the examples, the air tightness of any type of honeycomb structure can be acquired, and all the measurement values have an only error of ±2% or less from the reference value.

The holding jig of the present invention can hold even a brittle holding target without damaging the target. The measurement device using the holding jig can measure the through channel characteristics of the fluid in the through channel of the holding target held while acquiring the air tightness of the holding target having therein the through channel for the fluid. For example, the pressure loss of a DPF which is a honeycomb structure mounted in a car can simply be measured for a short time.

What is claimed is:

1. A holding jig comprising a first holding portion, a second holding portion, an elastic holding portion and a slide mechanism;

wherein the second holding portion is configured to move towards the first holding portion along a plane substantially parallel to a holding surface of a holding target;

wherein the elastic holding portion is provided at a tip position of the second holding portion;

wherein at least a part of a surface of the first holding portion and at least a part of a tip portion of the elastic holding portion each have a tilt face, respectively;

wherein the tilt face of the elastic holding portion is configured to move along the tilt face of said surface of the first holding portion while abutting therewith when the elastic holding portion is slid along said tilt faces; and wherein the tip portion of the elastic holding portion is configured to hold the holding target by directly contacting and thus applying pressure on the holding surface of the holding target generated by an elastic deformation of the elastic holding portion that results from being pressed between the tilt face of said surface of the first holding portion and the holding surface of the holding target before the tip portion of the elastic holding portion reaches a low end portion of the tilt face of said surface of the first holding portion.

2. The holding jig according to claim 1, wherein the tilt face of the first holding portion and the elastic holding portion are provided at positions facing the holding surface and in shapes corresponding to the holding surface in a plane vertical to a slide direction in a case where the slidable direction of the second holding portion is defined as the slide direction.

3. The holding jig according to claim 1, wherein in a plane vertical to a slide direction, a holding tilt angle is increased or decreased in the slide direction in accordance with the size of a curvature radius of the sectional shape of the holding surface.

4. The holding jig according to claim 1, wherein the tilt face of the first holding portion and the elastic holding portion are provided in a ring shape, and the holding surface of the holding target is configured to be air-tightly held by the elastic holding portion over the whole periphery thereof.

5. A measurement device, wherein a pair of holding jigs according to claim 4 are used as a first holding jig and a second holding jig, the measurement device comprising:

fluid passing means driven so that the fluid passes through a through channel of the holding target having an inflow end face through which the fluid flows into the holding target, an outflow end face through which the fluid flows out of the holding target and the through channel through which the fluid flows inwardly and outwardly in the holding target; and through channel characteristic measurement means for measuring through channel characteristics of the fluid passing through the holding target, wherein the through channel characteristics of the fluid generated during the passing of the fluid are measured by the through channel characteristic measurement means while air-tightly holding the holding surface of the holding target over the whole periphery of the side surface thereof on the side of the inflow end face by the first holding jig and while air-tightly holding the holding surface of the holding target over the whole periphery of the side surface thereof on the side of the outflow end face by the second holding jig.

6. The measurement device according to claim 5, further comprising:

a pair of pressure measurement means provided as the through channel characteristic measurement means on the inflow end face side and the outflow end face side, wherein a pressure loss generated during the passing of the fluid through the holding target is measured by a pressure difference measured by the pair of pressure measurement means.

7. A holding device in which the holding jig according to claim 1 is provided in a support portion, wherein the holding jig holds the holding target.

8. The holding device according to claim 7, comprising:

the support portion provided with the at least one holding jig; and a pressing jig provided in the support portion and disposed at a position facing the holding tilt face of the at least one holding jig, wherein the holding target is held by the holding jig and the pressing jig.

* * * * *